US008560197B2

(12) United States Patent
Sato

(10) Patent No.: US 8,560,197 B2
(45) Date of Patent: Oct. 15, 2013

(54) MOVING VEHICLE SYSTEM AND IN-POSITION DETERMINATION METHOD FOR MOVING VEHICLE

(75) Inventor: Hajime Sato, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 650 days.

(21) Appl. No.: 12/829,506

(22) Filed: Jul. 2, 2010

(65) Prior Publication Data

US 2011/0046839 A1 Feb. 24, 2011

(30) Foreign Application Priority Data

Aug. 18, 2009 (JP) ................................. 2009-188900

(51) Int. Cl.
*G06G 7/78* (2006.01)
*B62D 103/00* (2006.01)

(52) U.S. Cl.
USPC .................. 701/70; 701/50; 701/93; 701/408

(58) Field of Classification Search
USPC ......... 180/167, 168; 701/50, 93, 94, 408, 527
See application file for complete search history.

(56) References Cited

U.S. PATENT DOCUMENTS 5,887,268 A * 3/1999 Furukawa ....................... 701/23

FOREIGN PATENT DOCUMENTS

| | | | |
|---|---|---|---|
| JP | 03-149607 | A | 6/1991 |
| JP | 05-108128 | A | 4/1993 |
| JP | 07-036546 | A | 2/1995 |
| JP | 08-101707 | A | 4/1996 |
| JP | 08-249030 | A | 9/1996 |
| JP | 09-128054 | A | 5/1997 |
| JP | 2000-231412 | A | 8/2000 |

OTHER PUBLICATIONS

Official Communication issued in corresponding Japanese Patent Application No. 2009-188900, mailed on May 19, 2011.

* cited by examiner

*Primary Examiner* — Thomas Tarcza
*Assistant Examiner* — Adam Tissot
(74) *Attorney, Agent, or Firm* — Keating & Bennett, LLP

(57) ABSTRACT

A moving vehicle system for making an in-position determination when a moving vehicle enters an in-position range, includes a sensor arranged to determine a position, a velocity, and an acceleration of the moving vehicle, and computation unit arranged to determine whether a stop position of the moving vehicle is within an in-position range or not.

5 Claims, 5 Drawing Sheets

Prior Art

MOVING VEHICLE SYSTEM AND IN-POSITION DETERMINATION METHOD FOR MOVING VEHICLE

BACKGROUND OF THE INVENTION

1. Field of the Invention

The present invention relates to a moving vehicle system. In particular, the present invention relates to a technique of making an in-position determination, i.e., determining whether a moving vehicle can stop within an allowable range or not.

2. Description of the Related Art

In moving vehicles having multiple axes including a first axis and a second axis, the second axis is often operated based on a condition that the first axis enters a predetermined range (in-position range). For example, in the case of overhead traveling vehicles, when a position in a traveling direction enters a predetermined range, elevation of an elevation frame or lateral feeding is started. In the case of stacker cranes, automated transportation vehicles or the like, when the position in the traveling direction (and the position in the elevation direction of the stacker crane) enters a predetermined range, a transfer apparatus such as a slide fork is operated. Further, in the case of working machines or the like, when the position in the x-direction or the position in the x-y plane enters a predetermined range, a machining tool is moved along the z-direction of the second axis to start machining.

For the sequential operation of the first axis and the second axis, in-position determination has been adopted. In the in-position determination, when the position of the first axis enters an in-position range, operation of the second axis is started. For example, according to the disclosure of JP2000-231412A, subsequent to the movement in the x-y plane, for movement in the z-direction, in-position determination regarding the synthesized moving direction in the x-y plane is made, and one-dimensional in-position determination is made for the two-dimensional movement.

However, in the case of only adopting determination as to whether the current position is within an in-position range or not, after it is determined that the current position is within the in-position range, the moving vehicle may move out of the in-position range due to overshoot. This situation will be described with reference to FIGS. 6 and 7. FIG. 6 shows a situation where the moving vehicle stops without any vibrations. FIG. 7 shows a situation where overshoot occurs due to vibrations of the moving vehicle. In FIGS. 6 and 7, a graph a) shows a trajectory of a position, a graph b) shows a trajectory on a phase plane of the velocity and position, and a graph c) shows determination results of two-stage (rough and fine) in-position determination. In FIG. 6, the moving vehicle is decelerated toward a target position without any vibrations, and no overshoot occurs. In contrast, in FIG. 7, the position and velocity are not stable. The trajectory in the phase plane has a spiral pattern. After making an in-position determination, it becomes necessary to cancel the determination in the middle of operation.

SUMMARY OF THE INVENTION

Preferred embodiments of the present invention provide a moving vehicle system that rapidly and accurately determines whether there is any possibility that a moving vehicle will move out of an in-position range due to overshoot or not.

A preferred embodiment of the present invention relates to a moving vehicle system for making an in-position determination when a moving vehicle enters an in-position range.

The moving vehicle system includes a sensor arranged to determine a position, a velocity, and an acceleration of the moving vehicle, and a computation unit arranged to estimate based on the determined position, velocity, and acceleration whether a stop position of the moving vehicle is within the in-position range or not.

In a preferred embodiment of the present invention, the in-position determination is preferably performed when both of the current position and the estimated stop position are within the in-position range. If there is a possibility that the moving vehicle will move out of the in-position range, such an in-position determination is not made. Therefore, the determination can be made reliably. Further, in a preferred embodiment of the present invention, the determination is made based on the actual position, velocity, and acceleration of the moving vehicle, and the model of the moving vehicle is not required. Therefore, no errors resulting from modeling the moving vehicle are present.

In a preferred embodiment of the present invention, the computation unit is arranged to determine time series velocity data {vi} from time series position data {Pi}, and to determine time series acceleration data {ai} from the determined time series velocity data {vi}, where i denotes a time series suffix indicating data at present, and a distance from a current position Pi to the stop position is assumed to be substantially "$-vi^2/ai$". The expression "substantially" herein means that the value of "$-vi^2/ai$" may be multiplied by a constant of about 0.8 to 1.2, or an offset of about 1/10 to 1/100 of the in-position range may be added to or subtracted from "$-vi^2/ai$". The distance of substantially "$-vi^2/ai$" corresponds to the upper limit of the distance to the stop position. Therefore, if the position advanced by substantially "$-vi^2/ai$" from the current position is within the in-position range, the possibility that the moving vehicle will move out of the in-position range due to overshoot or the like can be determined as substantially zero. Further, this determination can be quickly performed by a simple computation.

Preferably, the sensor is a linear sensor arranged to determine the position of the moving vehicle. The position in a first axis direction is accurately measured on a short cycle.

Preferably, the in-position determination is performed when both of the current position determined by the sensor and the stop position estimated by the computation unit are within the in-position range.

Further, another preferred embodiment of the present invention provides a method of making an in-position determination when a moving vehicle enters an in-position range, the method including the steps of determining a position, a velocity, and an acceleration; estimating a stop position of a moving vehicle based on the determined position, velocity, and acceleration; and determining whether the estimated stop position of the moving vehicle is within the in-position range or not.

In this specification, the description regarding the moving vehicle system is directly applicable to the in-position determination method for the moving vehicle, and conversely, the description regarding the in-position determination method for the moving vehicle is directly applicable to the moving vehicle system.

Preferably, in the determination step, the in-position determination is performed when both of the current position determined by the sensor and the stop position estimated by the computation unit are within the in-position range.

These and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described. The scope of the present invention shall be determined according to understanding of a person skilled in the art based on the description of the claims in consideration of the description of the specification and techniques known in this technical field.

Figure 1:
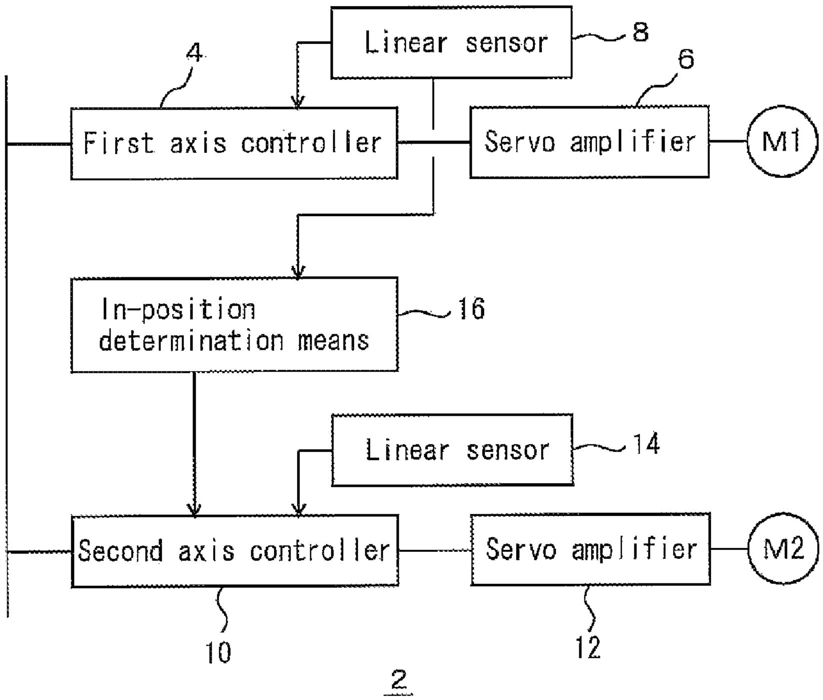
FIG. 1 is a block diagram showing main components of a moving vehicle system according to a preferred embodiment of the present invention.

FIGS. 1 to 4 show a moving vehicle system 2 according to a preferred embodiment of the present invention. In FIG. 1, a reference numeral 4 denotes a first axis controller, and a reference numeral 10 denotes a second axis controller. The first axis controller 4 drives a motor M1 through a servo amplifier 6, and the second axis controller 10 drives a motor M2 through a servo amplifier 12. A linear sensor 8 detects a position of the moving vehicle in a first axis direction, and inputs data of the detected position to the controller 4. A linear sensor 14 detects a position of the moving vehicle in a second axis direction, and inputs data of the detected position to the controller 10.

An in-position determination unit 16 generates time series velocity data based on time series position data from the linear sensor 8 in the first axis direction, and generates time series acceleration data from the time series velocity data. A stop position is estimated based on the current position, the current velocity, and the current acceleration, and whether the stop position is within an in-position range or not is determined. If the current position is within the in-position range, and the estimated stop position is within the in-position range, the in-position determination unit 16 performs an in-position determination. Based on the determination, the second axis controller 10 activates the motor M2.

In the illustrated preferred embodiment, the controllers 4, 10, the linear sensors 8, 14, the servo amplifiers 6, 12, and the in-position determination unit 16 preferably are provided in the moving vehicle. However, for example, in the case where the motors M1, M2 are linear motors having primary sides on the ground, and secondary sides of the motors M1, M2 are provided in the moving vehicle, the controllers 4, 10, the linear sensors 8, 14, the servo amplifiers 6, 12, and the in-position determination unit 16 may be provided on the ground. The linear sensors 8, 4 may be provided in the moving vehicle, or may be provided on the ground. For example, the linear sensors 8, 14 are preferably made up of a plurality of coils. The position relative to magnetic marks provided as targets of detection is detected based on the change in the inductance of the coils.

Figure 2:
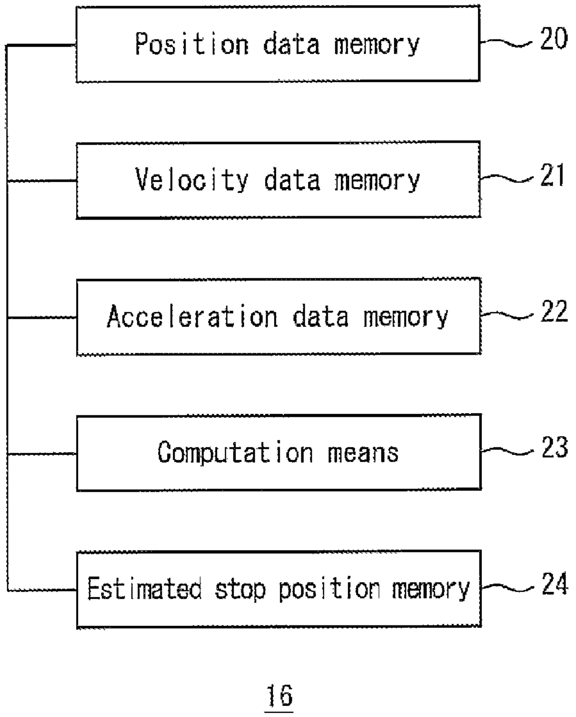
FIG. 2 is a block diagram showing in-position determination unit included in a preferred embodiment of the present invention.

FIG. 2 shows structure of the in-position determination unit 16. A position data memory 20 stores time series position data {Pi} from the linear sensor 8. A computation unit 23 generates time series velocity data {vi} from the difference between pieces of the time series position data {Pi}. A velocity data memory 21 stores the time series velocity data {vi}. The computation unit 23 generates time series acceleration data {ai} from time series velocity data {vi}, and stores the time series acceleration data {ai} in an acceleration data memory 22. The computation unit 23 uses the current position Pi, the current velocity vi, and the current acceleration ai to determine a stop position as "$Pi-vi^2/ai$". The negative sign means that acceleration is negative during deceleration. It is not required to strictly estimate the stop position as "$Pi-vi^2/ai$", as long as the estimated stop position is substantially "$Pi-vi^2/ai$". For example, the term "$vi^2/ai$" may be multiplied by a factor of 0.8 to 1.2, for example. Alternatively, an offset of, for example, about 1/10 to about 1/100 of the in-position range may be added to or subtracted from the term "$Pi-vi^2/ai$". The computation unit 23 stores the estimated stop position. The computation unit 23 makes an in-position determination when both of the current position and the estimated stop position are within the in-position range.

Figure 3:
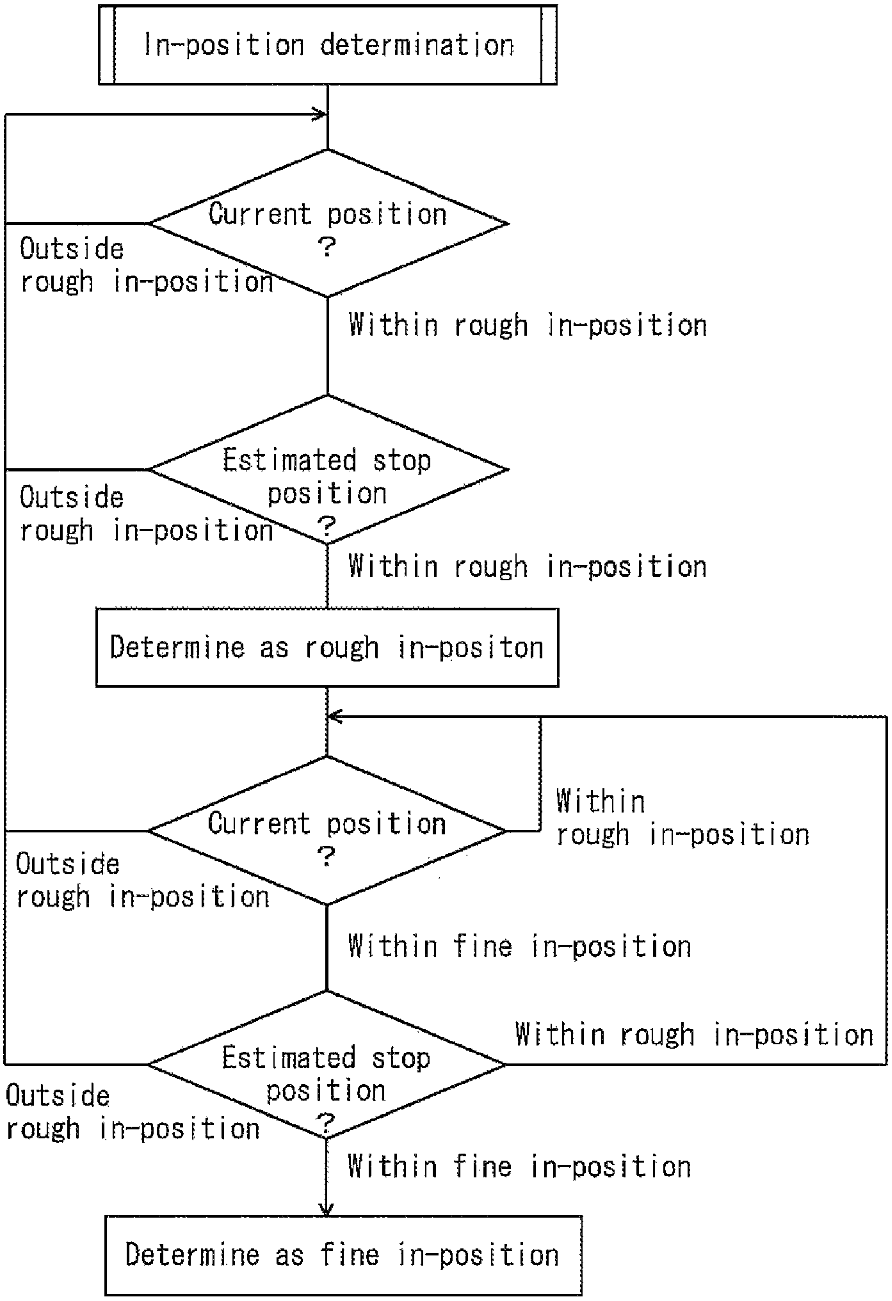
FIG. 3 is a flow chart showing an in-position determination algorithm used in a preferred embodiment of the present invention.
Figure 4:
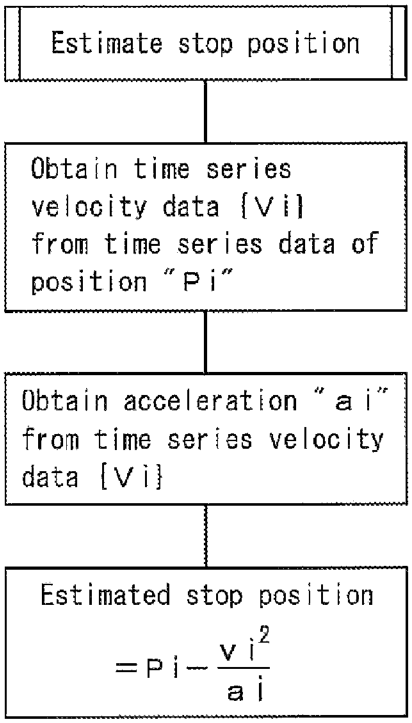
FIG. 4 is a flow chart showing an algorithm for estimating a stop position used in a preferred embodiment of the present invention.
Figure 5:
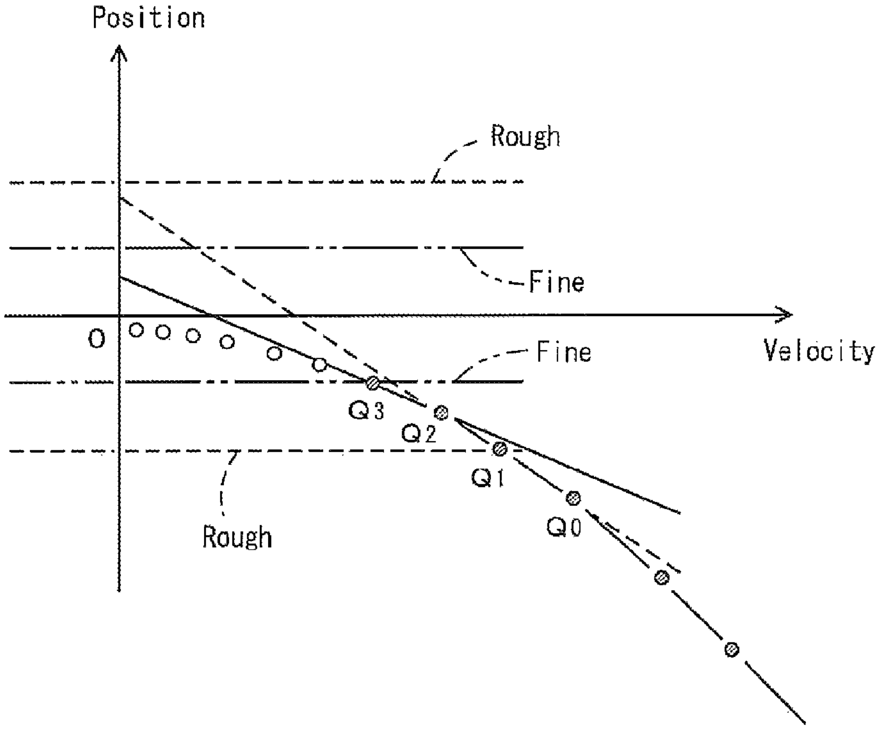
FIG. 5 is a graph showing estimation of the stop position using a phase plane in a preferred embodiment of the present invention.
Figure 6:
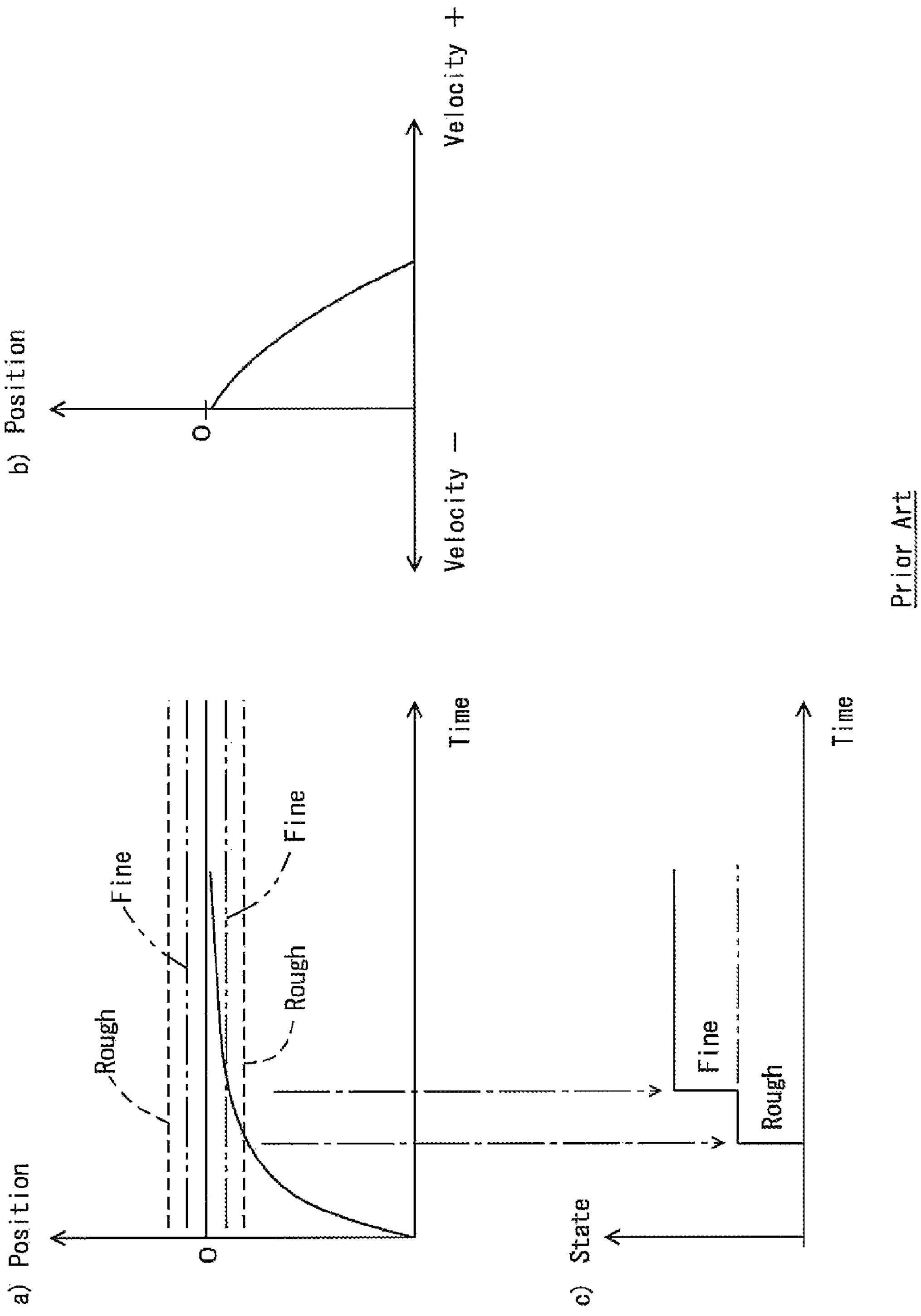
FIG. 6 includes graphs showing in-position determination in a conventional example, where a graph a) shows a trajectory of a moving vehicle that moves toward a target position without any vibrations; a graph b) shows a trajectory of the moving vehicle on a phase plane; and a graph c) shows a signal for determining a rough in-position and a signal for determining a fine in-position.
Figure 7:
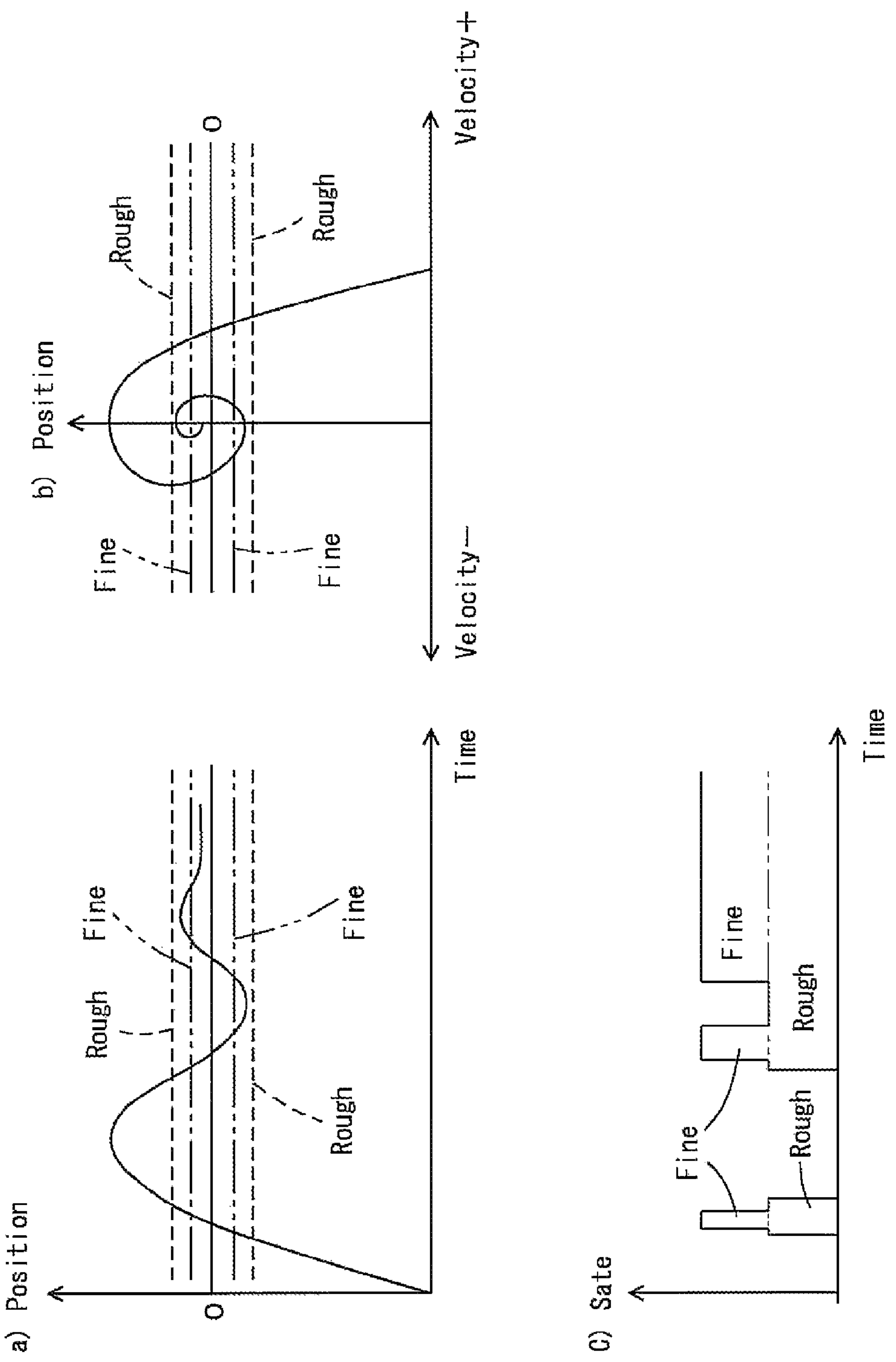
FIG. 7 includes graphs showing in-position determination in a conventional example, where a graph a) shows a trajectory of a moving vehicle that moves toward a target position while the moving vehicle is overshooting; a graph b) shows a trajectory of the moving vehicle on a phase plane of the moving vehicle; a graph c) shows a signal for determining a rough in-position and a signal for determining a fine in-position.

FIGS. 3 to 5 show a method of making an in-position determination. In this method, the in-position determination is performed in two stages, i.e., rough in-position and fine in-position. However, the method of the present invention is not limited in this respect. Alternatively, the in-position determination may be done in one stage, or in three or more stages. A rough in-position is determined in the case where both of the current position and the estimated stop position are within a rough in-position range. Next, a fine in-position is determined in the case where both of the current position and the estimated stop position are within a fine in-position range.

A mechanism of estimating the stop position will be described. Time series velocity data {vi} is obtained from time series position data {Pi}, and time series acceleration data fail is obtained from the time series velocity data {vi}. The estimated stop position is given by "$Pi-vi^2/ai$". As described above, the term "$vi^2/ai$" may be multiplied by a factor of 0.8 to 1.2, for example. Alternatively, an offset of, for example, about 1/10 to about 1/100 of the in-position range may be added to or subtracted from the term "$vi^2/ai$". It should be noted that the time series position data Pi may be obtained accurately on a small cycle from the liner sensor. Alternatively, the time series position data Pi may be obtained, e.g., from a laser distance sensor with a long measurement cycle.

The meaning of the term "$Pi-vi^2/ai$" is shown in FIG. 5. FIG. 5 shows a phase plane of the position Pi and the velocity vi. It is assumed that coordinates on the phase plane are denoted by Q0, Q1, Q2, Q3 in the order of the closest position to the target stop position. Further, it is assumed that both of the position and the velocity at the target stop position is "0". Here, at the time point Q1 when the moving vehicle enters the rough in-position range, for example, the intercept of the tangential line of the trajectory connected to, e.g., the point Q0 immediately before the point Q1 (broken line in FIG. 5) with the positional axis is determined, and it is determined whether the intercept is within the rough in-position range or not. Further, at the time point Q3 when the current position enters the fine in-position range, the intercept of a line connecting the previous point Q2 and the current point Q3 with the positional axis is determined, and it is determined whether the intercept is within the fine in-position range or not. In FIG. 5, the tangential line is produced from two points, i.e., the current position and the previous position immediately before the current position. Alternatively, the tangential line may be generated from four points, e.g., the current position is regarded as the center of between the points Q3, Q2, and the previous position is regarded as the center between the points Q1, Q0.

The meaning of the intercept obtained in this manner will be described. The points such as Q0 to Q3 are obtained from the linear sensor, and are not obtained from a model generated for controlling the moving vehicle. Further, since acceleration of the moving vehicle is determined to stop at the target position, in practice, as shown by white circles arranged in a row in FIG. 5, the moving vehicle stops at a position closer to the target position, from the tangential line in FIG. 5. For example, in the case where the moving vehicle is decelerated with constant acceleration motion, the stop position is calculated by "$Pi-vi^2/2ai$". The term "$-vi^2/ai$" is based on the assumption that the distance between the current position and the stop position of the moving vehicle is twice as large as that in the case of the constant acceleration motion. That is, the intercept with the positional axis in FIG. 5 is estimated assuming that the stop position of the moving vehicle is in a worst situation.

In the evaluation of FIG. 5, the stop position is estimated from the time series data of the actual position of the moving vehicle, and the model for controlling the moving vehicle is not included. For this reason, no influence due to errors at the time of modeling the moving vehicle is present. Therefore, the upper limit of the deviation from the target stop position can be estimated. Further, at the time of performing estimation in FIG. 5, since the position of the moving vehicle is within the rough in-position range, or within the fine in-position range, and the moving vehicle is decelerated, the moving vehicle never stops before the in-position range. For these reasons, it is possible to determine whether the moving vehicle will stop within the in-position range correctly and rapidly with simple computation.

Since it is possible to determine whether the moving vehicle can stop within the in-position range correctly and rapidly, not only the moving vehicle can be positioned correctly, but also the movement of the next second axis can be started further promptly.

Description of the Numerals

2: moving vehicle system
4, 10: controller
6, 12: servo amplifier
8, 14: linear sensor
16: in-position determination unit
20: position data memory
21: velocity data memory
22: acceleration data memory
23: computation unit
24: estimated stop position memory
M1, M2: motor While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A moving vehicle system for making an in-position determination when a moving vehicle enters an in-position range, the moving vehicle system comprising:

a sensor arranged to determine a position, a velocity, and an acceleration of the moving vehicle; and a computation unit arranged to determine whether a stop position of the moving vehicle will be within the in-position range or not, based on the determined position, velocity, and acceleration; wherein the computation unit is arranged to determine time series velocity data {vi} from time series position data {Pi} and to determine time series acceleration data {ai} from the determined time series velocity data {vi}, where i denotes a time series suffix and where Pi, vi, and ai respectively indicate a current position, a current velocity, and a current acceleration of the moving vehicle; and the computation unit is arranged to estimate an upper limit of the stop position as a distance of $-vi^2/ai$ from a current position.

2. The moving vehicle system according to claim 1, wherein the sensor is a linear sensor arranged to determine the position of the moving vehicle.

3. The moving vehicle system according to claim 1, further including an in-position determination unit arranged to perform an in-position determination when both of the current position determined by the sensor and the stop position estimated by the computation unit are within the in-position range.

4. A method of making an in-position determination when a moving vehicle enters an in-position range, the method comprising the steps of:

determining, by a determination unit, time series velocity data {vi} from time series position data {Pi} and determining time series acceleration data {ai} from the determined time series velocity data {vi}, where i denotes a time series suffix and where Pi, vi, and ai respectively indicate a current position, a current velocity, and a current acceleration of the moving vehicle;

estimating, by a computation unit, a stop position of a moving vehicle based on the determined position, velocity, and acceleration; and determining, by the computation unit, whether the stop position of the moving vehicle will be within the in-position range or not; wherein in the step of estimating the stop position, an upper limit of the stop position is estimated as a distance of $-vi^2/ai$ from a current position.

5. The method according to claim 4, wherein in the determination step, the in-position determination is made when both of the determined current position and the estimated stop position are within the in-position range.

* * * * *